United States Patent [19]

Knothe et al.

[11] 4,091,886
[45] May 30, 1978

[54] COMPENSATING FORCE-MEASURING OR WEIGHING DEVICE

[75] Inventors: Erich Knothe, Hasenwinkel; Christoph Berg; Eberhard Stadler, both of Gottingen, all of Germany

[73] Assignee: Sartorius-Werke GmbH, Gottingen, Germany

[21] Appl. No.: 762,679

[22] Filed: Jan. 26, 1977

[30] Foreign Application Priority Data

Feb. 5, 1976 Germany .............................. 2604437

[51] Int. Cl.² .......................... G01G 3/14; G01G 7/00
[52] U.S. Cl. .............................. 177/210 EM; 177/212
[58] Field of Search .......... 177/210 EM, 212, DIG. 5

[56] References Cited

U.S. PATENT DOCUMENTS

| | | | |
|---|---|---|---|
| 3,106,978 | 10/1963 | Cahn | 177/210 EM |
| 3,685,604 | 8/1972 | Smith et al. | 177/210 EM X |
| 3,688,854 | 9/1972 | Strobel | 177/210 EM X |

Primary Examiner—George H. Miller, Jr.
Attorney, Agent, or Firm—Browdy and Neimark

[57] ABSTRACT

An electromagnetic, compensating force-measuring or weighing device having at least one working coil movable in an air gap of a magnet system. At least two members for temperature compensation are positioned at different, spaced apart points. The compensating effect of these members on the active part of the system jointly produce a temperature compensating value which is optionally approximately equal to the exact value of the actual temperature curve. The members may be in the form of a plurality of minute particles of nonretentive material having a high negative coefficient of saturation magnetization distributed in the active part. The members may be formed of the afore-mentioned material and be positioned on the active part or be PTC or NTC resistors so positioned.

10 Claims, 5 Drawing Figures

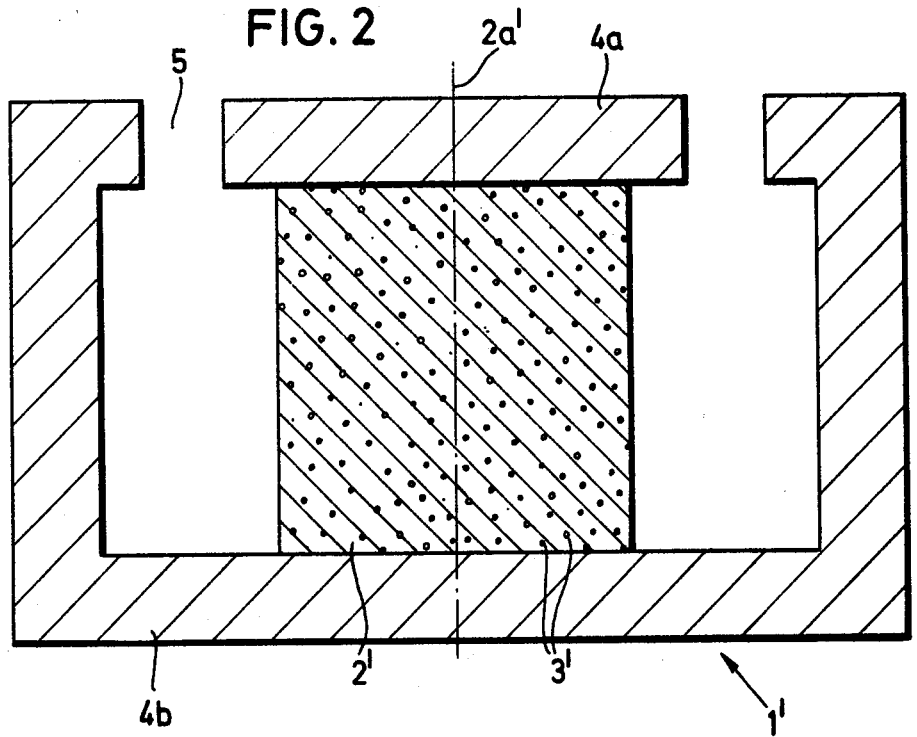
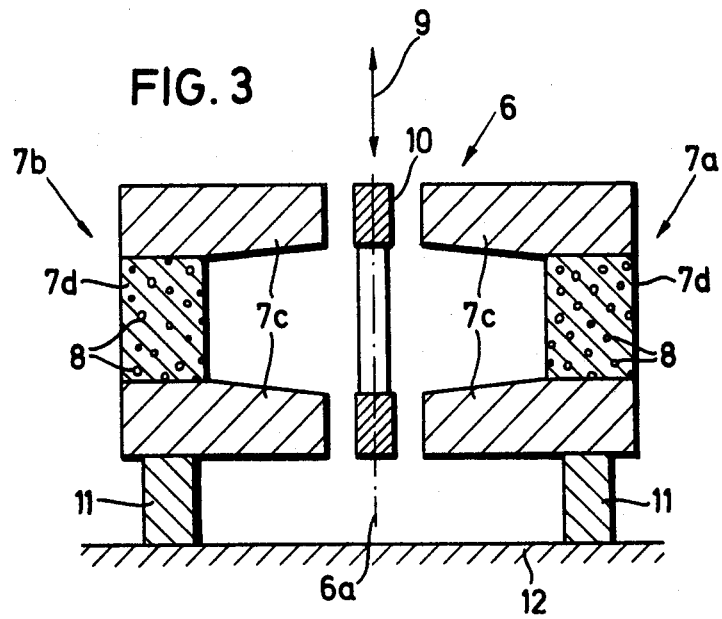

COMPENSATING FORCE-MEASURING OR WEIGHING DEVICE

BACKGROUND OF THE INVENTION

This invention relates to a compensating force-measuring or weighing device having at least one working coil movable in an air gap of a fixed magnet system and including means to compensate for temperature inclueness in the magnet system. The invention relates, more particularly, to an electromagnetic compensating force-measuring or weighing device of the stated nature.

Decives of this type are known and described, for example, in German Federal Republic Offenlegungsschrift (Laid Open Patent Application) No. 2,400,881. There are usually two available possibilities for compensating the temperature dependence of the magnetic field strength of the permanent magnet system used in such weighing or force-measuring devices. In one case, a temperature-dependent network is connected parallel to its measuring resistor, so that the latter has an opposite temperature coefficient. The temperature-dependent resistor in the network is placed in the best possible thermal contact with the magnet system.

In the second case, low-retentivity materials having high negative temperature coefficients during saturation magnetization are mounted magnetically parallel to the air gap. The material manufactured by the firm of Vacuumschmelze, Hanau, and known by the name of "Thermoflux" (registered trademark) is suitable for this purpose, for example. These materials are usually mounted on the active (magnet) part of the magnet system, and preferably cemented thereto; in rotation-symmetric magnet systems the material is wrapped around the cylindrical active part, for example.

These techniques make it possible to achieve good compensation of temperature dependence with thermal equilibrium in a magnet system. However, if temperature gradients appear in the magnet system which are steeper or even change abruptly at various points, as can occur, for example, when more or less electrical energy is converted into heat in the working coil, the different temperature conditions resulting from point-wise or area-wise application of compensating material and the active magnetic material which extends over a large volume can cause not insignificant problems relating to sufficiently accurate temperature compensation.

SUMMARY OF THE INVENTION

It is an object of the present invention to provide temperature compensation in a compensating force-measuring or weighing device of the type described hereinabove, the compensation being reliable and problem-free even with changing temperature gradients.

According to the present invention, the foregoing object, as well as others which are to become clear from the text below, is achieved in a device of the type described hereinabove by positioning members for temperature compensation, with predetermined weighting relative to their compensating effect, on the active part of the magnet system, separately at at least two points, jointly resulting in a temperature value optimally related to the exact average of the actual temperature curve which is obtained.

An important advantage is achieved by mounting the members for compensating temperature influences at at least two preferably unsymmetrical or statistically distributed points on the active part of the magnet system by virtue of the fact that temperature changes in the form of an average can be obtained in the magnet system, i.e., it is possible to ensure that the average temperature of the active magnetic material is optimally matched to the average value of the temperature of the compensating members mentioned hereinabove.

According to an advantageous embodiment of a device according to the present invention, at least one first member for temperature compensation is provided at a point at which a temperature change initially occurs as expected, or a large temperature deviation occurs, while at least one second member for temperature compensation is mounted at at least one other point remote from the first point in an area whose temperature is substantially constant, as expected, or at which the least temperature variation is expected. On the basis of this arrangement of the at least two members for temperature compensation, the first member is influenced directly, and at least very rapidly, by any temperature change, while the second member is influenced as little as possible, or at least not directly, by a temperature change.

According to an advantageous embodiment of a device according to the present invention, the members for temperature compensation are made of nonretentive material having a highly temperature-dependent saturation magnetization characteristic, while in another advantageous embodiment of a device according to the present invention the members for temperature compensation include negative temperature coefficient (NTC) resistors or positive temperature coefficient (PTC) resistors, which are circuit components of a correcting resistance network.

In addition, in a magent system with an active part which is made in the form of a cylindrical core, a first member for temperature compensation can be provided, in the form of a cylindrical jacket of nonretentive material having a high negative temperature coefficient of saturation magnetization, on the jacket surface, and a second member for temperature compensation, in the form of a cylinder made of the same material, can be provided in the center of the core and mounted approximately symmetrically relative to its central axis. An especially good match between the temperature of the active part of the magnet system and the temperature of the compensating devices is obtained when these members are in the form of small particles of a nonretentive material, with a high negative temperature coefficient of saturation magnetization, in the active part of the magnet system, and are statistically distributed in the active part.

The device according to the invention prevents a significant temperature differential from developing between the average temperature of the active part of the magnet system and the average value of the temperatures of the devices for temperature compensation. At the same time, reliable and trouble-free temperature compensation is ensured under all ambient conditions, especially with changing and different temperature gradients in the magnet system.

BRIEF DESCRIPTION OF THE DRAWINGS

FIG. 2 is a diagramatic, sectional view of a rotation-symmetric magnet system which includes members for temperature compensation according to a second embodiment of the present invention.

FIG. 3 is a diagramatic, sectional view of a magnet system with a working coil and which includes members for temperature compensation according to a third embodiment of the present invention.

DETAILED DESCRIPTION OF THE PREFERRED EMBODIMENTS

Figure 1:
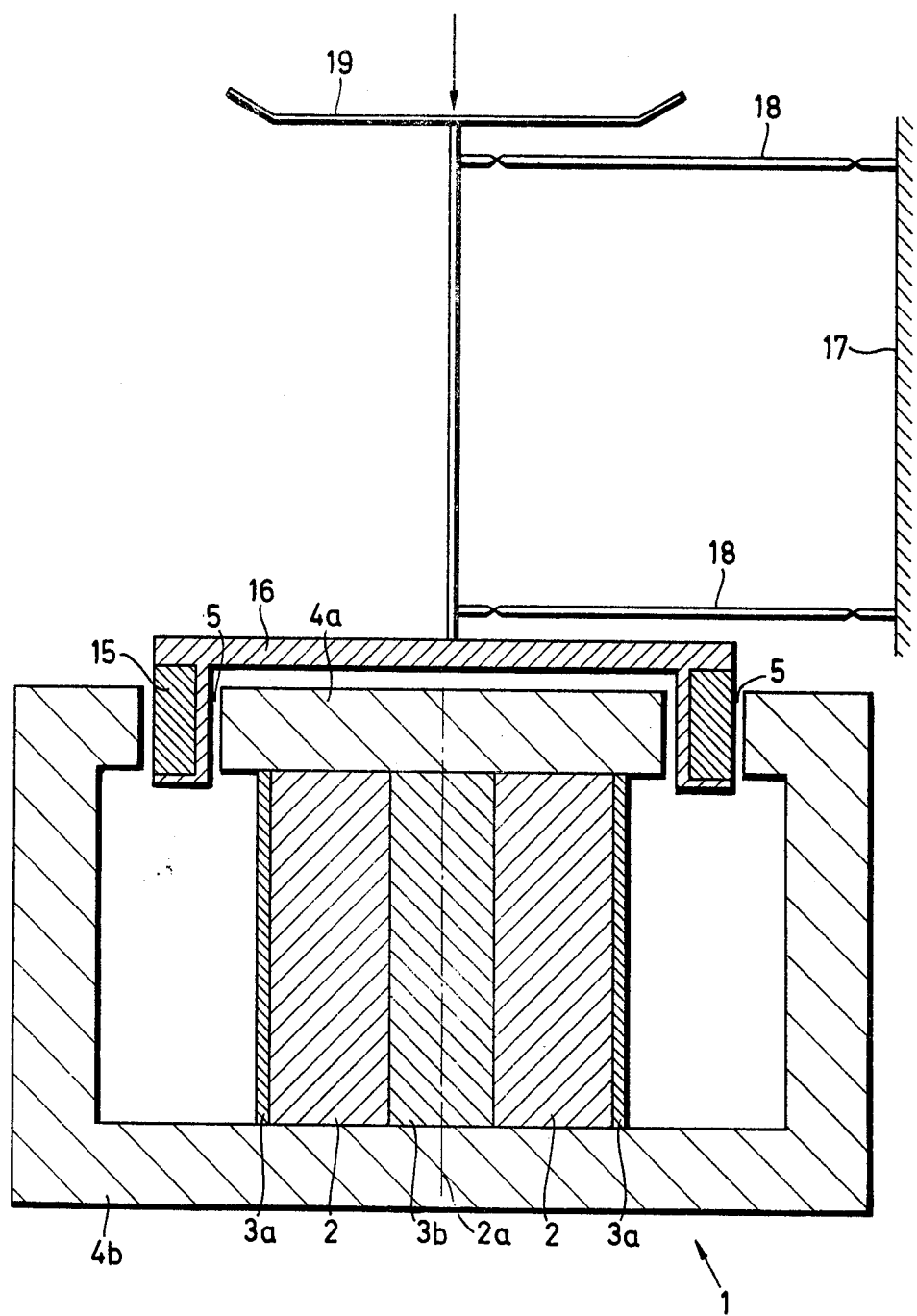
FIG. 1 is a diagramatic, sectional view of a rotation-symmetric magnet system which includes members for temperature compensation according to a first illustrative embodiment of the present invention.

FIG. 1 shows a cross section of a rotation-symmetric magnet system 1, whose active (magnet) part is in the shape of a cylindrical core 2. A first member 3a for temperature compensation is mounted on the outside surface of the core 2, this member preferably being formed of a nonretentive material having a high negative temperature coefficient of saturation magnetization or a negative temperature coefficient resistor of a correcting network, while a second member 3b for temperature compensation, made of the same material, is positioned approximately symmetrically relative to a central axis 2a, shown as a dot-dash line. The system of FIG. 1 includes a disk-shaped part 4a made of soft iron mounted on the top of the cylindrical core 2. A rotation-symmetric magnetic return 4b made of soft iron, magnetic and approximately U-shaped in cross section, is mounted around the cylindrical core 2. Between the disk-shaped upper part 4a and magnetic return 4b an approximately annular air gap 5 is formed.

According to FIG 1, a working coil 15 is mounted in a holder 16 in the air gap 5. A pan 19 is mounted on the holder 16, the pan 19 being guided via parallel guides 18 relative to a fixed part 17 shown schematically.

The predetermined weighting of the members 3a and 3b for temperature compensation is accomplished by mutual determination of the cross sections using nonretentive material or the resistance values employing negative or positive temperature coefficient resistors.

FIG. 2 shows a cross section of a magnet system 1' which is rotation-symmetric and similar to the system of FIG. 1, parts corresponding to those in FIG. 1 being labelled with the same numerals. In contrast to the magnet system 1 shown in FIG. 1, members 3' for temperature compensation are distributed in an active part in the form of a cylindrical core 2' which is symmetrical with respect to a central axis 2a' shown as a dot-dash line, these members 3' being made of a soft magnetic (nonretentive) material a high negative temperature coefficient during saturation magnetization. The members 3' are statistically distributed, as minute elements, throughout the core 2'. The distribution of the members 3' as minute units for temperature compensation roughly corresponds to the distribution of "holes in a Swiss cheese". Based on this distrigution of the temperature-compensation members 3' throughout the entire active core 2', an especially good correspondence is achieved in this particular magnet system between the temperature of the active core 2' of the magnet system and the temperature of the compensating members. The design and arrangement of the disk-shaped part 4a, the magnetic return 4b and the air gap 5 correspond to those in FIG. 1.

FIG. 3 shows a cross section of a symmetrical magnet system 6, which has two C-shaped magent parts 7a and 7b mounted symmetrically relative to a central axis 6a shown as a dot-dash line. The magnet parts 7a and 7b each have two legs 7c made of soft iron and a respective central part 7d which constitutes the active part, wherein, as in FIG. 2, members 8 for temperature compensation are essentially uniformly distributed in the form of minute units made of nonretentive material having high negative temperature coefficients during saturation magnetization. Between the free legs 7c of the two magnet parts 7a and 7b, a rectangular coil 10, shown schematically, is mounted; this coil 10 is mounted symmetrically with respect to the central axis 6a and can be moved in the directions indicated by the double arrow-headed line 9. The C-shaped magnet parts 7a and 7b are mounted by conventional mounting supports 11 shown schematically on a fixed base 12, likewise illustrated schematically.

Figure 4:
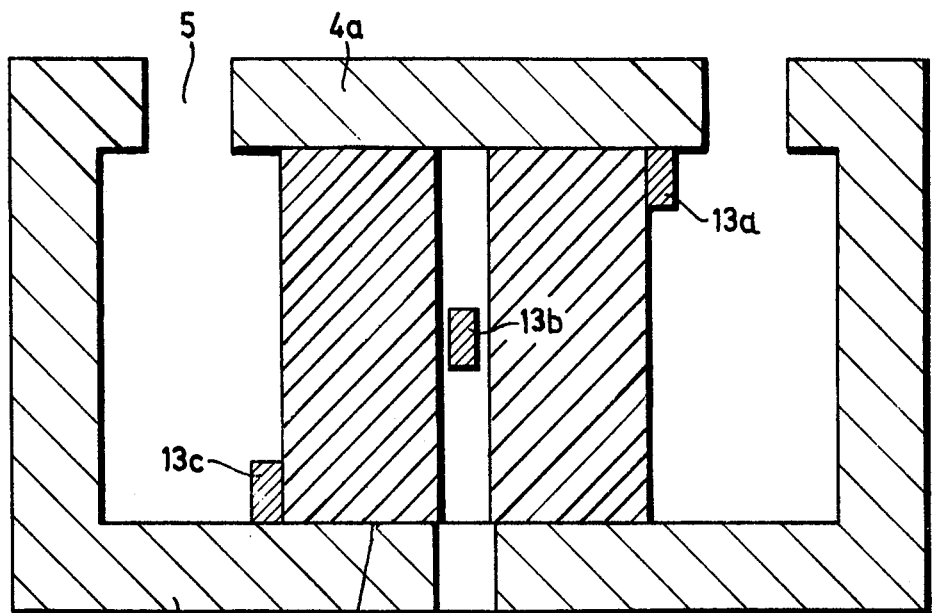
FIG. 4 is a diagramatic, sectional view of a rotation-symmetric, magnet system which includes members for temperature compensation in the form of temperature coefficient resistors according to a fourth embodiment of the present invention.

FIG. 4 shows a magnet system 1" much like that of FIG. 1, corresponding parts being identified with identical reference numerals. The embodiment shown in FIG. 4 differs from the embodiment shown in FIG. 1 in that instead of the members 3a and 3b for temperature compensation being made of a nonretentive material with a high negative temperature coefficient during saturation magnetization, negative temperature coefficient resistors 13a, 13b and 13c are provided, with the resistors 13a and 13c each being mounted in the form of a disk around an active core 2" of the magnet system 1", while the resistor 13b is cylindrical and mounted in a central bore of the active core 2". The resistor 13a is mounted immediately below the disk-shaped part 4a made of soft iron and around the active core 2", while the resistor 13c is mounted in the immediate vicinity of the U-shaped magnetic return 4b made of soft iron, around the lower end of active core 2". The cylindrical resistor 13b is mounted about halfway up the central bore in the core 2" approximately midway between the resistors 13a and 13c.

Of course, instead of using negative temperature coefficient resistors 13a, 13b and 13c as shown, positive temperature coefficient resistors could be used, which would be connected appropriately.

Figure 5:
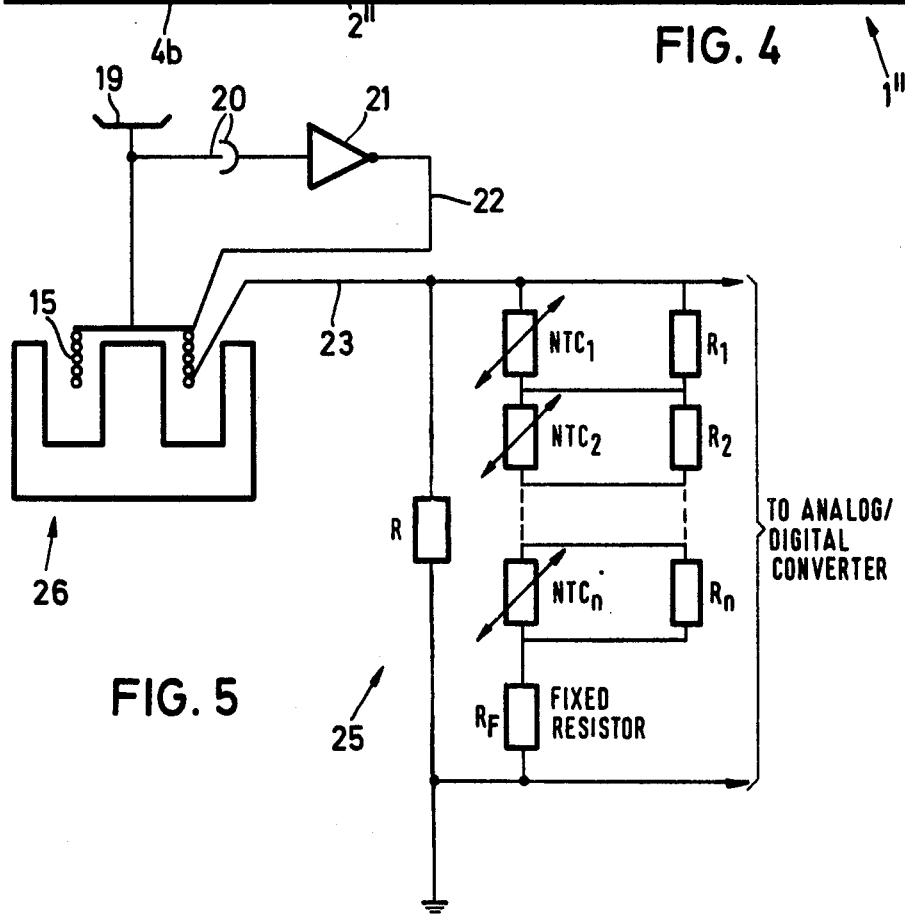
FIG. 5 is a schematic block diagram of a correction network incorporating negative temperature coefficient resistors.

FIG. 5 shows a circuit diagram of a correcting network, which includes a plurality of negative temperature coefficient (NTC) resistors used for temperature compensation. The block diagram shows in purely schematic form, a magnet system 26 with a working coil 15, connected to a pan 19. A position indicator 20 is connected, via an amplifier 21 and a lead 22 and via the working coil 15 and another lead 23 to a correcting network 25. The correcting network 25 includes series-connected negative temperature coefficient resistors $NTC_1$, $NTC_2$ ... $NTC_n$; so-called linearization resistors $R_1$, $R_2$ ... $R_n$ are individually connected in parallel with respective ones of the negative temperature coefficient resistors. A pre-set fixed resistance $R_F$ is connected in series with the resistors $NTC_1$, $NTC_2$ ... $NTC_n$ while an additional line resistor R is connected in parallel with these negative temperature resistors and the fixed resistor.

The linearization resistors $R_1$, $R_2$ ... $R_n$ connected in parallel with the resistors $NTC_1$, $NTC_2$ ... $NTC_n$ are used for linearizing the somewhat curved known resistance characteristic of the negative temperature coefficient resistors.

The linearizing resistors $R_1, R_2 \ldots R_n$ can have a resistance value on the order of one kilo-ohm, while the fixed resistor $R_F$ can have a resistance value on the order of 10 kilo-ohms. The values of the resistors $NTC_1$, $NTC_2 \ldots NTC_n$ are on the order of one kilo-ohm and can be different from one another or can differ from one another as a function of the required weighting which is produced by the arrangement of the negative temperature coefficient resistors relative to the magnet system and the electrical characteristics of these resistors. The line resistor R connected in parallel with the series connected resistors $NTC_1, NTC_2 \ldots NTC_n$ and the fixed resistor $R_F$ has a resistance value on the order of 100 ohms.

The two output terminals of the correcting network 25 are connected to an analog-digital (A/D) converter (not shown), as is usual, in known fashion for electromagnetically compensating balances.

For optimum weighting of the members for temperature compensation, the following mathematical equation can be of particular use:

$$\frac{1}{V}TdV = \frac{\Sigma_n g_n T_n}{\Sigma_n g_n} \quad (1).$$

In the above set out equation T is temperature, V is magnet volume and $g_n$ are weighting factors.

A nonretentive material having a negative temperature coefficient of saturation magnetization and being suitable to be used for members 3a, 3b, 3' and 8 is, e.g. any iron-nickel-alloy with a nickel content of about 30% by weight. A more specific example is a sintered temperature compensating material with the following constituents: 69,2% Fe, 29,9% Ni, 0,7% Cr and 2% B.

It is to be understood that the foregoing discussion and accompanying figures of drawing relate to embodiments set out by way of example, not by way of limitation. It is to be appreciated that various other embodiments and numerous varients are possible without departing from the spirit and scope of the invention, its scope being defined in the appended claims.

What is claimed is:

1. In an electromagnetic, compensating force-measuring or weighing device having at least one working coil movable in an air gap of a fixed magnet system, including a given active part, and means for compensating temperature influences in the magnet system, the improvement wherein said means for compensating comprise at least two members for temperature compensation, with predetermined weighting relative to their compensating effect on said given active part of said magnet system, said members being mounted separately from one another at at least two different points having different temperature influenced characteristics in the system for jointly producing a temperature compensating value which is optimally approximately equal to the exact average value of the actual temperature curve.

2. An improved device according to claim 1, wherein at least one first member for temperature compensation is provided at a first point in the system at which it is anticipated that a temperature change will initially occur, and at least one second member for temperature compensation is mounted at at least one other point in the system spaced from the first point in an area where temperature is anticipated to remain substantially constant.

3. An improved device according to claim 1, wherein at least one first member for temperature compensation is provided at a first point at which it is anticipated that a considerable temperature deviation will occur, and at least one second member for temperature compensation is mounted at at least one other point spaced from the first point in an area temperature whose temperature is anticipated to remain substantially constant.

4. An improved device according to claim 1, wherein said active part is made in the form of a cylindrical core, a first member for temperature compensation being in the shape of a cylindrical jacket consisting essentially of nonretentive material having a high negative temperature coefficient of saturation magnetization and positioned on the outside surface of said core, and a second member for temperature compensation in the shape of a cylinder and made of the same material as said first member is located in the center of said core approximately symmetrically relative to its central axis.

5. An improved device according to claim 1, wherein said members for temperature compensation comprise a plurality of minute particles consisting essentially of a retentive material having a high negative coefficient of saturation magnetization statistically distributed within said active part of said magnet system.

6. An improved device according to claim 1, wherein said members for temperature compensation are members consisting essentially of nonretentive material having a high temperature coefficient of saturation magnetization.

7. An improved device according to claim 6, wherein said material has a high negative temperature coefficient of saturation magnetization.

8. An improved device according to claim 1, wherein said members for temperature compensation comprise temperature coefficient resistors forming circuit components of a correcting resistance network.

9. An improved device according to claim 8, wherein said resistors are negative temperature coefficient resistors.

10. An improved device according to claim 8, wherein said resistors are positive temperature coefficient resistors.

* * * * *